Patented Mar. 24, 1936

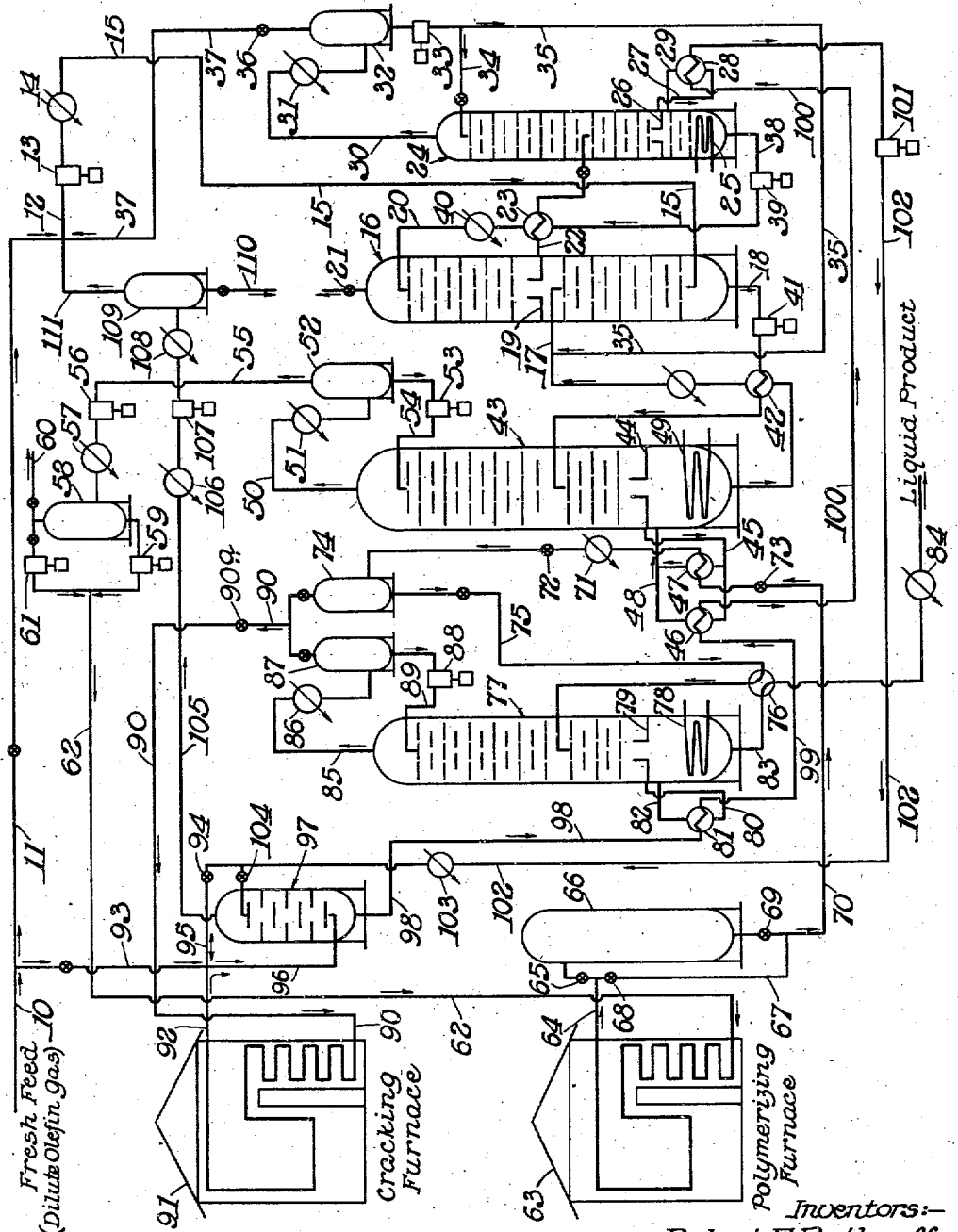

2,035,409

UNITED STATES PATENT OFFICE

2,035,409

OLEFIN CONCENTRATION AND POLYMERIZATION

Robert F. Ruthruff, Joseph K. Roberts, and Morris T. Carpenter, Hammond, Ind., assignors to Standard Oil Company, Chicago, Ill., a corporation of Indiana Application July 17, 1933, Serial No. 680,776

14 Claims. (Cl. 196—10)

Our invention consists of an improved process for the polymerization of gaseous olefins. It is well known that pure gaseous olefins can be polymerized to low boiling liquids at elevated temperatures and pressures but the expense of obtaining pure gaseous olefins by previous processes has been prohibitive. Our process provides for obtaining concentrated olefins from dilute gaseous olefins and in particular provides means for the approximately complete conversion of the hydrocarbon gases in the original gas feed to low boiling liquid products.

In practicing our invention, dilute olefinic gases are concentrated by scrubbing with liquid butane or equivalent liquefied hydrocarbon fractions whereby methane and other fixed gases are eliminated and olefin gases are absorbed in the butane. The desired concentrated olefin gases are recovered by stripping distillation of the liquid butane under high pressure. The vent gases from the scrubbing or absorption step are preferably scrubbed with a heavier absorber oil in order to recover butane which is carried away from the absorber by said vent gases, in which case the butane is then stripped from the heavier absorber oil and returned to the system. The concentrated olefin gases after recovery from the butane solvent are compressed and finally pumped into a polymerization furnace in which they are heated to temperatures of 800–1050° F. while under pressure of 500–3000 lbs. per square inch. The products may be passed through an unheated reaction drum while under this temperature and pressure, following which liquid products are separated from gases and the gases are passed through a gas cracking furnace wherein they are heated to temperatures of 1300–1750° F. while under pressure of 0–200 lbs. per square inch above atmospheric. The hot gases from the cracking furnace are quenched down to a temperature of 1100° F. or thereabouts by admixing therewith a part of the original dilute olefinic gas feed. The mixed gases are then further cooled by suitable means, direct contact with relatively cool gas oil being preferred. The cooled mixed gas is then admixed with the balance of the fresh dilute olefinic gas feed so that both streams are concentrated as previously described prior to being introduced into the polymerization system. The heat of the gas oil, or other heat exchange liquid used to cool products of the cracking stock, is utilized in the olefin concentration steps. The quenching of cracked products is effected by feed gases which are not cracked or altered thereby. Other features of the invention will be apparent as the description proceeds.

The drawing attached hereto, which forms a part of this specification, represents a diagrammatic elevational view of suitable apparatus for carrying out our process.

Referring to the drawing, the operation of our process in detail is as follows: Dilute olefinic gas is introduced into the system through line 10. This gas may contain from 10% to 50% of gaseous olefins but ordinarily it contains between 15% and 30% of gaseous olefins. This gas passes through line 11 to line 12 where it may be joined with several other gas streams as later described. It is then compressed by compressor 13 to pressures of about 150–300 lbs. per square inch after which it is cooled by cooler 14 to a temperature of about 100° or less. The gas is then passed through line 15 to a low point in absorber 16 wherein it is scrubbed counter-currently by liquid butane introduced through line 17. Although we prefer to use relatively pure liquid butane we may operate our process with any liquefied mixture such as propane, butane or pentane, or any mixture thereof.

Liquid butane containing dissolved olefinic gases is removed from absorber 16 through line 18. Scrubbed gases from 16 pass into another absorber which for convenience is shown as the upper part of absorber 16, the two sections being separated by suitable trap out tray 19. In this upper section the gases are scrubbed with light scrubbing oil of 30–40° A. P. I. gravity introduced through line 20. By this means any butane carried out of the main absorbing section by the unabsorbed gases is dissolved in the scrubbing oil and is recovered. The final scrubbed gases are removed through vent 21 and may be sent to the fuel system. The scrubbing oil containing recovered dissolved butane is removed from tray 19 through line 22 and preferably is preheated in heat exchanger 23 prior to introduction into the stripping still 24 at a point near the middle thereof. A pressure of 50–100 lbs. per square inch is maintained in the stripping still and a temperature of about 350–400° F. is maintained in the bottom thereof by means of steam heating coils 25 and also preferably by withdrawing bottoms liquid from trap out tray 26 through line 27, passing same through heat exchanger 28 and returning same through line 29 to the bottom section of still 24. Live steam for stripping may also be introduced into the bottom of still 24 (connection not shown). The butane vapors are removed from the top of the still 24 through line 30 and pass through cooler 31 to reflux drum 32. Liquid product from drum 32 is withdrawn by pump 33 and part may be returned through line 34 as reflux to the upper section of still 24. The remainder of the liquid butane from drum 32 is passed through line 35 to butane supply line 17 entering absorber 16. Uncondensed gases from drum 32 may be passed through valve 36 in line 37 whereby said gases join the original dilute olefin gas feed in line 12 and are thereby recycled for further concentration treatment. The hot stripped scrubbing oil from stripping still 24 is removed from the bottom through line 38 and is passed by pump 39 preferably through heat exchanger 23 followed by cooler 40 to the inlet line 20 of the oil scrubbing section of absorber 16.

Butane containing dissolved olefinic gases and removed through line 18 from the bottom of absorber 16 is preferably passed by pump 41 through heat exchanger 42, and is introduced to a mid-point in butane stripping still 43 wherein the olefinic gases are recovered from the butane. This stripping still 43 is preferably operated at a pressure of between 350–500 lbs. per square inch with a bottom temperature of 250–350° F. The bottom temperature is preferably maintained by withdrawing bottoms liquid from trap out tray 44 and passing same through line 45 and heat exchangers 46 and/or 47 and returning same to the bottom section of stripping still 43 through line 48. In addition, however, steam heating coils 49 may be positioned in the lower section of still 43. A top temperaure of about 125–175° F. is maintained in the upper section of stripper 43 by cooling coils not shown, or preferably by suitable reflux. Vapors from still 43 are removed through line 50 and pass through cooler 51 to reflux drum 52 from which part of the condensed liquids may be returned by pump 53 through line 54 to stripping still 43 as reflux.

The major part of the gases, vapors and/or condensed liquids from drum 52 are withdrawn through line 55 and are compressed by compressor 56 to a pressure of 500–1500 lbs. at which pressure (after cooling in 57 to about 100° F.) practically all materials are condensed to liquids.

The concentration of the gaseous olefins in the gases removed through line 55 from our concentrating system depends largely on the concentration of olefins in the fresh feed introduced through line 10. Our improved concentration system effects the approximately complete removal of methane and hydrogen from the feed gas without appreciable loss of higher boiling desirable constituents. Depending on the characteristics of the dilute olefinic gas feed the final gas in line 55 may have a concentration of 40–70% olefins.

After cooler 57 the almost completely liquefied mixture is introduced into separator 58 from which liquids are withdrawn by pump 59. Any small amount of unliquefied gas which may be present may be vented through vent 60 or may be compressed by compressor 61 to the desired polymerization reaction pressure. Pump 59 and compressor 61 both deliver into line 62 which leads to the inlet of polymerization furnace 63 wherein the olefinic gases are heated to a temperature of 800–1050° F. while under pressure of 500–3000 lbs. per square inch. The exit gases from pipe heater 63 may be passed through line 64 and valve 65 into soaking drum 66 or the soaking drum may be by-passed through line 67 by opening valve 68 and closing valve 65 and exit valve 69. The combined liquid products and unreacted gases from reaction drum 66 or line 67 are passed through line 70 and preferably through heat exchanger 47 which is followed by cooler 71. The pressure on the products is reduced to about 250–350 lbs. per square inch but preferably to about 300 lbs. per square inch at valve 72 or facultatively at valve 73 prior to heat exchanger 47. The products and gases are then introduced into separator 74 which operates at the aforementioned pressure and at a temperature in the vicinity of 60° F. Liquid products are moved from separator 74 through line 75 preferably passing through heat exhanger 76 prior to introduction at a mid-point of stabilizer 77. In stabilizer 77 a pressure of 250–350 lbs. per square inch, but preferably about 300 lbs. per square inch, is maintained, the bottom being maintained at a temperature of about 350–400° F. by heating coils 78 or preferably by withdrawing bottoms liquid from trap out tray 79 passing same through line 80, heat exchanger 81, and returning same through line 82 to the lower section of stabilizer 77.

Final liquid products are withdrawn from stabilizer 77 through line 83 preferably passing through heat exchanger 76 followed by cooler 84 through which they are withdrawn to storage and/or chemical treatment and/or rerunning prior to ultimate consumption.

Gases and vapors eliminated in stabilizer 77 are withdrawn through line 85, passed through cooler 86, to reflux drum 87 which is maintained at a temperature not over 100° F. and from which pump 88 withdraws a suitable quantity of liquid condensate for introduction through line 89 as reflux to stabilizer column 77. Gases from separator 74 and reflux drum 87 are removed through line 90. These gases are passed through valve 90a at which partial or approximately complete reduction in pressure may be effected, then passing to the inlet of gas cracking furnace 91 wherein the gases are heated under a pressure of 0–200 lbs. per square inch above atmospheric to temperatures of 1300–1750° F. whereby saturated gases such as ethane, propane and butane are cracked to form additional olefinic gases. Exit gases from heater 91 in line 92 are preferably quenched to about 1100° F. by admixture of a sufficient proportion of fresh dilute olefinic gas feed from line 10 which is introduced through line 93. This method of quenching is preferred since the cracked olefinic gases from the heater are to be mixed (immediately after cooling) with the fresh olefinic gases from line 10, as later described, so that preliminary admixture with said gases for quenching purposes is a most advantageous method of carrying out the operation. We may, under certain conditions replace all or a part of the cold gas quenching agent by relatively cold gas oil introduced to the point of admixture with hot cracked gases through valve 94 in line 95.

The quenched gases at a temperature of not over 1100° F. are introduced through line 96 to direct contact cooler 97 wherein they are cooled by direct contact with a suitable cooling medium preferably a refractory gas oil of 30–40° A. P. I. gravity. The hot gas oil from the bottom of cooler 97 is withdrawn through line 98 and is preferably passed seriatim through heat exchanger 81, line 99, heat exchanger 46, line 100, heat exchanger 28, pump 101, line 102 and optionally cooler 103 prior to introduction through valve 104 into cooler 97. The relatively cool gases from cooler 97 pass through line 105 and preferably through cooler 106 prior to compressor

107 wherein the gases are compressed to a pressure equal to that at which the fresh feed gases are supplied through lines 10 and 11. The compressor 107 may be followed by cooler 108 and separator 109 from which any separated heavy liquids may be withdrawn through 110 while the gases pass through line 111 for admixture in line 12 with fresh feed gases from lines 10 and 11.

Various modifications of our improved process will be evident to those skilled in the art and in particular with respect to details of heating and heat exchange.

While we have described in detail a preferred embodiment of our invention, we do not limit ourselves to any of these details except as defined by the following claims, which should be construed as broadly as the prior art will permit.

We claim:

1. In a process for obtaining liquid products from dilute olefinic gases, the steps of concentrating said gases to increase their olefin content, polymerizing said concentrated gases at elevated temperatures and pressures, subjecting unconverted gases to cracking at temperatures of 1300–1750° F. to increase their olefin content, quenching said cracked gases by admixture with a part of the original dilute olefinic feed gases, further cooling the quenched gas mixture and mixing said cooled mixture with the balance of said original dilute olefinic gas feed prior to concentration thereof.

2. In a process for obtaining liquid products from dilute olefinic gases, the steps of concentrating said dilute olefinic gases by scrubbing with liquid butane, eliminating undissolved gases from the system, recovering concentrated olefin gases from said liquid butane, and polymerizing said concentrated olefinic gases at elevated temperatures and pressures to yield liquid products.

3. In a process for obtaining liquid products from dilute olefinic gases, the steps of concentrating said dilute olefinic gases by scrubbing with liquid butane, eliminating undissolved gases from the system, recovering concentrated olefin gases from said liquid butane, polymerizing said concentrated olefinic gases at elevated temperatures and pressures to yield liquid products, and scrubbing fixed gases from the butane absorption step with an oil scrubbing medium and recovering butane from the latter.

4. In a process for obtaining liquid products from dilute olefinic gases, the steps of concentrating said dilute olefinic gases by scrubbing with liquid butane, eliminating undissolved gases from the system, recovering concentrated olefin gases from said liquid butane, polymerizing said concentrated olefinic gases at elevated temperatures and pressures to yield liquid products, separating said liquid products from unconverted gases, subjecting said unconverted gases to cracking at temperatures of 1300–1750° F. to yield an olefinic gas, and admixing said olefinic gas with original dilute olefinic gas feed prior to concentration thereof as above described.

5. In a process for obtaining liquid products from dilute olefinic gases, the steps of concentrating said dilute olefinic gases by scrubbing with liquid butane, eliminating undissolved gases from the system, recovering concentrated olefinic gases from said liquid butane, polymerizing said concentrated olefinic gases at elevated temperatures and pressures to yield liquid products, separating said liquid products from unconverted gases, subjecting said unconverted gases to cracking at temperatures of 1300–1750° F. to yield an olefinic gas, quenching said cracked gases by admixture with a part of the original dilute olefinic feed gases, further cooling the quenched gas mixture and mixing said cooled mixture with the balance of said original dilute olefinic gas feed prior to concentration thereof.

6. In a process for obtaining liquid products from dilute olefinic gases, the steps of concentrating said gases to increase their olefin content, polymerizing said concentrated gases at elevated temperatures and pressures to yield normally liquid products and unconverted gases, subjecting said unconverted gases to cracking at temperatures of about 1300–1750° F. to increase their olefin content, quenching said cracked gases by admixture with dilute olefinic bases, and introducing the quenched mixture into said first mentioned concentration step.

7. The process for obtaining liquid products from hydrocarbon gases, which comprises compressing said gases to a pressure of about 150–300 pounds per square inch, scrubbing the compressed gases with butane under said pressure and at a temperature of less than 100° F., separating the absorbed gases from the butane at a pressure of about 350–500 pounds per square inch in a zone with a bottom temperature of 250–350° F. and a top temperature of about 125–175° F., compressing the olefins removed from the butane to a pressure of about 500–1500 pounds per square inch, heating said compressed olefins to a temperature of about 800–1050° F. under a pressure of 500–3000 pounds per square inch to cause polymerization of said olefins, cooling the resulting products and releasing the pressure thereof to about 250–350 pounds per square inch, separating normally liquid products from normally gaseous products at said pressure, subjecting the separated gases to a cracking step under a pressure of from 0–200 pounds per square inch above atmospheric and a temperature of about 1300–1750° F., cooling the cracked gases, and subjecting them to said concentration and polymerization steps.

8. The process of claim 7 wherein the hot products from the gas-cracking step are quenched by gas oil and wherein said heated gas oil thereafter supplies heat for effecting the separation of gases from polymerized liquids.

9. The combination of claim 7 wherein the hot products from the cracking step are quenched with gas oil and the heat of said gas oil is utilized for removing olefins from the butane solution.

10. The process of claim 7, which includes the step of recovering butane which escapes with unabsorbed gases in the olefin absorption steps, and returning said butane to the system.

11. The process of claim 7 wherein the compressed olefins under a pressure of 500–1500 pounds per square inch are cooled and liquefied prior to their injection into the polymerization zone.

12. In a process for separating hydrogen and methane from olefinic gases, the steps which comprise scrubbing dilute olefinic gas with liquid butane, eliminating unabsorbed gases from the liquid butane, and subsequently recovering concentrated olefin gases therefrom.

13. In a process for obtaining liquid products from dilute olefinic gases, the steps of concentrating said dilute olefinic gases by scrubbing with liquid butane, eliminating undissolved gases from the system, recovering concentrated olefin gases from said liquid butane, polymerizing said concentrated olefinic gases at elevated temperatures and pressures to yield liquid products and returning the liquid butane after the concentrated olefin gases have been recovered therefrom to the concentrating step for scrubbing said dilute olefinic gases.

14. In a process for obtaining liquid products from dilute olefinic gases, the steps of concentrating said gases to increase their olefin content, polymerizing said concentrated gases at elevated temperatures and pressures to yield normally liquid products and unconverted gases, subjecting said unconverted gases to cracking at temperatures of about 1300–1750° F. to increase their olefin content, quenching said cracked gases by admixture with dilute olefinic gases, and thereafter polymerizing olefinic gases in said quenched mixture at elevated temperatures and pressures.

ROBERT F. RUTHRUFF.
JOSEPH K. ROBERTS.
MORRIS T. CARPENTER.

DISCLAIMER 2,035,409.—*Robert F. Ruthruff, Joseph K. Roberts*, and *Morris T. Carpenter*, Hammond, Ind. OLEFIN CONCENTRATION AND POLYMERIZATION. Patent dated March 24, 1936. Disclaimer filed April 22, 1939, by the assignee, *Standard Oil Company*.

Hereby enters this disclaimer to claims 2 and 13 in said specification.
[Official Gazette May 16, 1939.]

tures and pressures to yield liquid products and returning the liquid butane after the concentrated olefin gases have been recovered therefrom to the concentrating step for scrubbing said dilute olefinic gases.

14. In a process for obtaining liquid products from dilute olefinic gases, the steps of concentrating said gases to increase their olefin content, polymerizing said concentrated gases at elevated temperatures and pressures to yield normally liquid products and unconverted gases, subjecting said unconverted gases to cracking at temperatures of about 1300–1750° F. to increase their olefin content, quenching said cracked gases by admixture with dilute olefinic gases, and thereafter polymerizing olefinic gases in said quenched mixture at elevated temperatures and pressures.

ROBERT F. RUTHRUFF.
JOSEPH K. ROBERTS.
MORRIS T. CARPENTER.

DISCLAIMER 2,035,409.—*Robert F. Ruthruff, Joseph K. Roberts*, and *Morris T. Carpenter*, Hammond, Ind. OLEFIN CONCENTRATION AND POLYMERIZATION. Patent dated March 24, 1936. Disclaimer filed April 22, 1939, by the assignee, *Standard Oil Company*.

Hereby enters this disclaimer to claims 2 and 13 in said specification.
[Official Gazette May 16, 1939.]

DISCLAIMER 2,035,409.—*Robert F. Ruthruff, Joseph K. Roberts*, and *Morris T. Carpenter*, Hammond, Ind. OLEFIN CONCENTRATION AND POLYMERIZATION. Patent dated March 24, 1936. Disclaimer filed April 22, 1939, by the assignee, *Standard Oil Company*.

Hereby enters this disclaimer to claims 2 and 13 in said specification.

[Official Gazette May 16, 1939.]